United States Patent [19]

Takahashi

[11] Patent Number: 5,623,479
[45] Date of Patent: Apr. 22, 1997

[54] INFORMATION RECORDING MEDIUM HAVING A PROTECTION FILM AND A READING APPARATUS FOR READING OUT INFORMATION FROM THE INFORMATION READING MEDIUM

[75] Inventor: Koichi Takahashi, Hachioji, Japan

[73] Assignee: Olympus Optical Co., Ltd., Tokyo, Japan

[21] Appl. No.: 461,249

[22] Filed: Jun. 5, 1995

[30] Foreign Application Priority Data

Jun. 16, 1994 [JP] Japan .................................. 6-134174

[51] Int. Cl.⁶ .................................................. G11B 7/00
[52] U.S. Cl. ................................. 369/275.5; 369/58
[58] Field of Search ..................... 369/54, 47, 58, 369/32, 275.1–275.5, 44.32

[56] References Cited

U.S. PATENT DOCUMENTS

| | | | |
|---|---|---|---|
| 4,855,992 | 8/1989 | Ikegawa et al. | 369/275.2 |
| 5,235,591 | 8/1993 | Nakamura et al. | 369/199 |
| 5,270,987 | 12/1993 | Kaku et al. | 369/13 |
| 5,363,352 | 11/1994 | Tobita et al. | 369/47 |
| 5,485,444 | 1/1996 | Kuhn et al. | 369/58 |

FOREIGN PATENT DOCUMENTS

0670555A1   9/1995   European Pat. Off. .

*Primary Examiner*—Nabil Hindi
*Attorney, Agent, or Firm*—Frishauf, Holtz, Goodman, Langer & Chick

[57] ABSTRACT

A substantially transparent optical protection film formed on the surface of an information recording medium on which a dot pattern is printed for preventing printing quality from being degraded due to wear of the dot pattern. The protection film is formed to have such an optical thickness as to lower a predetermined amount of contrast of the dot pattern so that an image of dust or flaw on the protection film is defocused on an image pickup device, with the result that an adverse effect of the dust or flaw upon reading of the dot pattern can be eliminated.

6 Claims, 5 Drawing Sheets

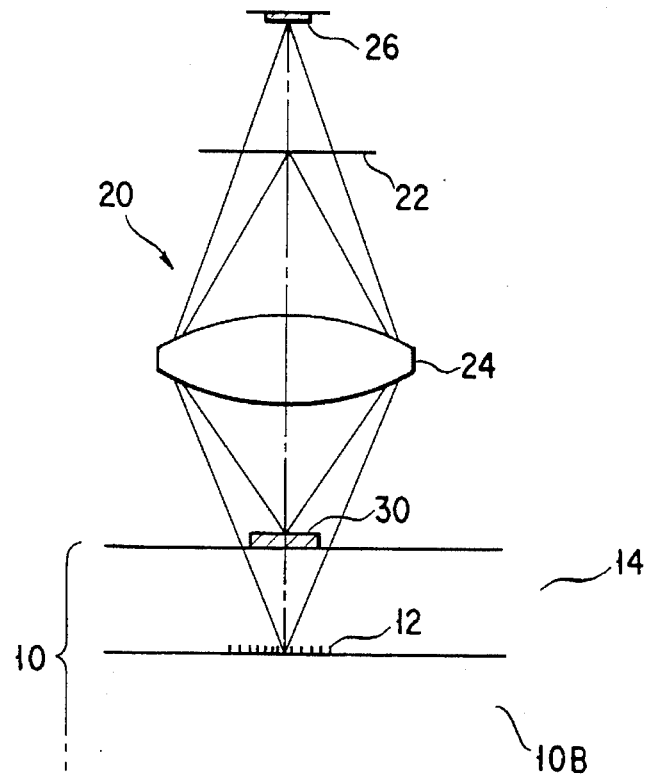
F I G. 1
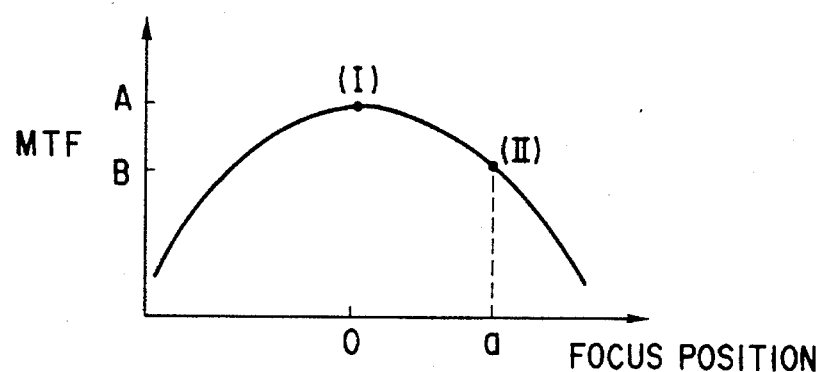
F I G. 2A
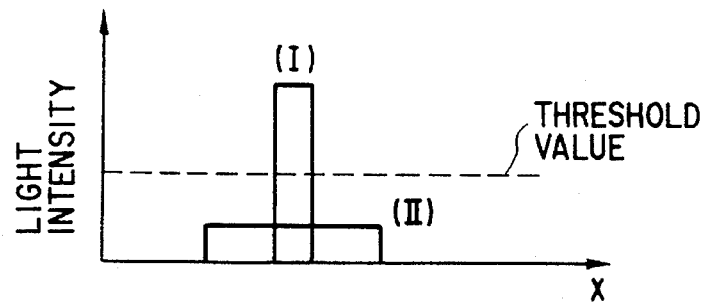
F I G. 2B

INFORMATION RECORDING MEDIUM HAVING A PROTECTION FILM AND A READING APPARATUS FOR READING OUT INFORMATION FROM THE INFORMATION READING MEDIUM

BACKGROUND OF THE INVENTION

1. Field of the Invention

The present invention relates to a recording medium formed of paper, various types of resin film, metal, etc. on which information is recorded as optically readable dot codes and a reading apparatus for reading the dot codes recorded on the recording medium. More specifically, the present invention relates to a reading apparatus capable of eliminating an adverse effect of a flaw or dust on the recording medium upon reading a pattern of the dot codes.

2. Description of the Related Art

Various recording mediums such as magnetic tapes and optical disks for recording voice information, music information, and the like have been known conventionally. The unit price of these mediums is somewhat high even though their reproductions are mass-produced, and a very large space is required for keeping them. Furthermore, it takes time and trouble to transfer a recording medium on which voice information is recorded from one person to another person far away therefrom, even though it is mailed or sent by hand.

The above problems are true of so-called multimedia information including video information acquired from cameras, video equipment, etc., digital code data (text data) obtained from personal computers, wordprocessors, etc., and the like.

A system for recording/reproducing multimedia information on/from a sheet of paper, various types of film, metal, etc. in the form of image information, i.e., dot code which can be sent by facsimiled and mass-reproduced at low cost, was invented and filed as International Application No. PCT/JP93/01377. This application was published on Apr. 14, 1994 as International Publication No. WO 94/08314.

The dot code is formed of a plurality of two-dimensionally arranged blocks, as illustrated in FIG. 16 of the international application. Each of the blocks includes a marker, data of x and y addresses of the block, data for detecting and correcting an error of the addresses, and a data area in which data is actually stored. The dot of the marker and that of the data are different in size such that they can be distinguished from each other. The recording/reproducing system therefore has a dot code structure wherein the location of data can be specified by detecting that of the marker.

A reading apparatus for reading the multimedia information is constituted as shown in FIG. 17 of the above international application. The dot code recorded on a recording medium is scanned and the image is picked up by an image pickup device. An image signal corresponding to the image is decoded to reproduce the original multimedia information. The reading apparatus is so constituted that the multimedia information can be correctly reproduced even if the dot code is scanned obliquely.

However, if dot code is printed on a recording medium of ordinary paper with commonly-used ink or toner and the reading apparatus is brought into contact with the recording medium, or friction occurs between them, the pattern of the printed dot code may disappear or the ink may blur on the paper. Consequently, the original multimedia information cannot be reproduced correctly.

Moreover, if a flaw or dust is attached to the surface of the pattern, it is projected on the image pickup device and formed as an image. Thus, the pattern is read incorrectly, and the original multimedia information cannot be reproduced correctly.

SUMMARY OF THE INVENTION

The present invention has been developed in consideration of the above situation.

An object of the present invention is to provide an information recording medium capable of preventing a pattern of dot code from degrading in printing quality due to wear and reducing an adverse effect of a flaw or dust upon reading of the pattern.

Another object of the present invention is to provide a reading apparatus capable of preventing a pattern of dot code from degrading in printing quality due to wear and reducing an adverse effect of a flaw or dust upon reading of the pattern.

According to one aspect of the present invention, there is provided an information recording medium comprising:

an information recording medium base member on which information represented by a dot pattern having a light refractive index other than that of a surface of the information recording medium base member, is recorded; and a protection film provided on an upper surface of the dot pattern recorded on the information recording medium base member and having such an optical thickness as to lower a predetermined amount of contrast of the dot pattern.

According to another aspect of the present invention, there is provided an information reading apparatus for reading information recorded on an information recording medium having a protection film, comprising:

image pickup means for picking up an image of the information recorded on the information recording medium;

recognition means for, upon receiving image signals from the image pickup means, recognizing one of the image signals, which corresponds to an object on the protection film, as a non-information signal; and reproduction means for reproducing the information recorded on the information recording medium in response to image signals other than the non-information signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a conceptual view of an information recording medium and a reading apparatus according to an embodiment of the present invention;

FIG. 2A is a graph of variations in MTF (modulation transfer function) when an object is moved in the optical axis direction from the best focus position;

FIG. 2B is a graph showing the intensity of light applied onto an image pickup device in cases (I) and (II) of FIG. 2A;

DETAILED DESCRIPTION OF THE PREFERRED EMBODIMENT

Figure 3:
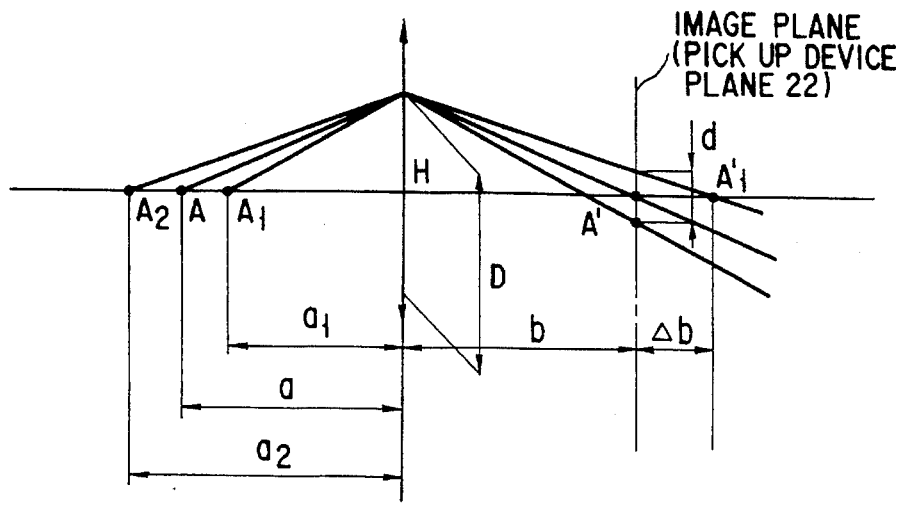
FIG. 3 is a view showing an optical relationship for explaining the optical thickness of a protection film which is obtained from the dot pitch of dot code recorded on an information recording medium.

An embodiment of the present invention will now be described, with reference to the accompanying drawings.

In FIG. 1, an image pickup optical system 24 is arranged such that a pickup device plane 22 of a reading apparatus 20 and a pattern 12 of dot code (referred to as a dot pattern hereinafter) formed on a recording medium base member 10B of an information recording medium 10 are optically conjugated with each other. A high-contrast image of the dot pattern 12 can thus be formed on the plane 22, and an exact image can be reproduced accordingly. The reading apparatus 20 will be described in detail later.

A transparent protection film 14 of a certain thickness is formed on the recording medium base member 10B. The protection film 14 creates the following advantages: (1) The dot pattern 12 can be used repeatedly for a long time without degrading the printing condition of the dot pattern 12. (2) If dust 30 or the like is attached onto the information recording medium 10, a reproduced image of the dot pattern 12 includes an image of the dust, and it is read as incorrect information. An adverse effect due to such a phenomenon can be lessened.

The above advantage (2) will now be described more specifically.

Since the transparent protection film 14 is formed on the base member 10B, the conjugate location (image 26) of the dust 30 attached to the film 14 is far away from the plane 22 on which the image of the dot pattern 12 is formed. The image of the dust 30 is thus defocused on the plane 22. As a result, an adverse effect of the dust 30 or the like upon reading of the dot pattern 12 formed on the base member 10B, can be reduced.

In this embodiment, the resolution of the optical system 24 needs to be substantially equal to or higher than the dot pitch of the dot pattern 12. The thickness of the protection film 14 is calculated according to the dot pitch, which will be described later.

The MTF (Modulation Transfer Function=ratio of the contrast of an object to that of an image), which varies according to the optical performance of the optical system 24, is usually decreased with variations in locations of the object.

FIG. 2A shows variations in MTF when the object is moved in the optical axis direction from the best focus position. In FIG. 2A, the abscissa indicates the location of the object, while the ordinate does the MTF. Assuming that the best focus is (I) and the movement of the object in the optical axis direction by $a$ is (II), (I) represents the dot pattern 12 and (II) does the dust 30 on the protection film 14. The MTF of both cases (I) and (II) are A and B (A>B). If the contrast of the object is $c$ and that of its image is c', the MTF is defined as:

$$MTF = c'/c \qquad (1)$$

If the maximum light intensity of the object is $I_{max}$, that of the image is $I'_{max}$, the minimum light intensity of the object is $I_{min}$, and that of the image is $I'_{min}$, $c$ and c' are expressed as follows:

$$c = (I_{max} - I_{min})/(I_{max} + I_{min}) \qquad (2)$$

$$c' = (I'_{max} - I'_{min})/(I'_{max} + I'_{min}) \qquad (3)$$

As is apparent from equation (3), the decrease in MTF means that the maximum light intensity of the image relatively lowers.

FIG. 2B shows the light intensity on the image pickup device in both cases (I) and (II). In FIG. 2B, the ordinate indicates the relative light intensity, while the abscissa does the coordinate of an image formed on the device, that is, the size of an image spot.

In case (I), the light intensity is high since the MTF is large, and the spot is small since the object is focused. In case (II), since the MTF is small, the light intensity is low and the image is defocused, thus the image spot becomes large.

The image reproduced on the image pickup device is not recognized as an information signal unless the light intensity exceeds a predetermined threshold value. If the threshold value is one indicated by the broken line in FIG. 2B, the reproduced image is not recognized in case (II); therefore, the dust 30 or the like on the protection film 14 is not read as information.

The optical thickness of the protection film 14, calculated according to the dot pitch (recording density) of the dot pattern 12, will now be described.

FIG. 3 shows an optical relationship where an object point is A, an image point is A', and a principal point of the optical system 24 is H. In FIG. 3, the distance between the principal point H and the object plane, which is perpendicular to the optical axis of the object point A, is $a$ and the distance between the principal point H and the image plane (pickup device plane 22), which is perpendicular to the optical axis of the image point A', is $b$.

Assume that a light beam emitted from an object point $A_1$, which is closer to the optical system 24 than the object point A, causes a defocus of diameter $d$ on the image plane. If the distance between the object point $A_1$ and principal point H is $a_1$, an image point corresponding to the object point $A_1$ is $A_1'$, the distance between the image point A' and object point $A_1'$ is $\Delta b$, and the focal length and F number of the system 24 are f and F, respectively, the following equations are given:

$$1/b = -(1/a) + (1/f) \quad (4)$$

$$1/(b+\Delta b) = -(1/a_1) + (1/f) \quad (5)$$

The principal plane, which is perpendicular to the optical axis of the principal point H, coincides with an exit pupil. If the diameter of the exit pupil is D, $$D/d = (b+\Delta b)/\Delta b \quad (6)$$

From the above equations (4) to (6), the following is obtained:

$$a_1 = (a \times f^2)/\{f^2 + d \times F \times (a-f)\} \quad (7)$$

If an object, which is located farther than the object point A and at which a defocus of the same diameter $\underline{d}$ occurs, is $A_2$ and the distance between the principal point H and object point $A_2$ is $a_2$, $a_2$ is expressed by the above equation.

$$a_2 = (a \times f^2)/\{f^2 - d \times F \times (a-f)\} \quad (8)$$

The following is obtained from equations (7) and (8).

$$2/a = 1/a_1 + 1/a_2 \quad (9)$$

In actual, it can be considered that a >f, therefore, the following expression is given:

$$a - f \cong a$$

If the distance between the object points A and $A_1$ is $t_1$ and the distance between the object points A and $A_2$ is $t_2$, $$t_1 = a - a_1$$

$$t_1 = (d \times a_2 \times F)/(f^2 + d \times a \times F) \quad (10)$$

$$t_2 = a_2 - a$$

$$t_2 = (d \times a_2 \times F)/(f^2 - d \times a \times F) \quad (11)$$

Assuming that the distances $t_1$ and $t_2$ are approximate to each other, $$t_1 = t_2(d \times a_2 \times F)/F^2 = (d \times F)/\beta^2 \quad (12)$$

where β is magnification.

If the size of the dust 30 is close to the dot pitch, there is strong possibility that the dust is read as pseudo information and, in this case, a problem is easy to occur. Assume that the size of the dust 30 on the protection film 14 is the same as dot pitch ε. If the amount of defocus $\underline{d}$ on the image pickup device is equal to the dot pitch ε, the size (area) of the dust image 26 of the dust is quadrupled, and the light intensity is reduced substantially in inverse proportion to the area of the dust image 26. It can thus be considered that the contrast of the dust image 26 is sufficiently decreased.

If the distance $t_1$ in the above equation (12) is considered to be the thickness $\underline{t}$ of the protection film 14, and the refractive index of the film 14 is represented by $\underline{n}$, the thickness $\underline{t}$ is given by:

$$t = (k \times \epsilon \times F)/(\beta^2 \times n) \quad (13)$$

where k is a constant (k≧1.0).

For example, if dot pitch ε is 30 μm, F number F is 20, magnification β is 0.8, and refractive index $\underline{n}$ of the protection film 14 is 1.5, the thickness $\underline{t}$ of the film 14 is represented by:

$$\begin{aligned} t &= (1.0 \times 30 \times 10^{-6} \times 20)/(0.8^2 \times 1.5) \\ &= 0.625 \times 10^{-3}. \end{aligned}$$

Thus, the thickness of the protection film 14 has only to be 0.625 mm or larger.

When information, which is recorded by periodic white and black patterns on the information recording medium 10 including the protection film 14, is read out by the reading apparatus 20, the dust 30 or the like on the protection film 14 can reliably be prevented from being read out as information if the reading apparatus 20 has the following functions.

The first function is to vary a threshold value for recognizing the light intensity of the image as an information signal.

The dust 30 or the like attached onto the protection film 14 is formed as a low-contrast image, as described above. If, however, the light intensity of the image is higher than the threshold value shown in FIG. 2A, it will be read as information. In this case, therefore, if the threshold value is varied to increase, only the information pattern can be read without reading the image of the dust 30.

A reading apparatus having a structure capable of varying such a threshold value is disclosed in International Publication No. WO 94/08314. The apparatus includes a circuit for processing an image signal generated from an image pickup device, and the circuit has only to include both a circuit for determining a threshold value when an output signal of an image memory is binarized and a mechanism capable of externally controlling the level of the threshold value.

The second function is to vary the F number of the optical system 24 of the reading apparatus 20. Since the image of the dust 30 or the like attached onto the protection film 14 is formed farther than the image pickup device, it is defocused on the image pickup device. If, however, the defocus is slight and the contrast is not so lowered, the focal depth of the optical system 24 has only to be decreased.

To vary the F number, a structure for shortening the focal length by varying the magnification (including zoom) or that for increasing the diameter of the pupil according to a variable diaphragm, has only to be provided, since the focal depth of the optical system 24 is substantially proportionate to the F number.

The case where the light intensity of the dust image 26 is higher than the threshold value, will now be described with reference to FIGS. 4A through 4C.

Figure 4A:
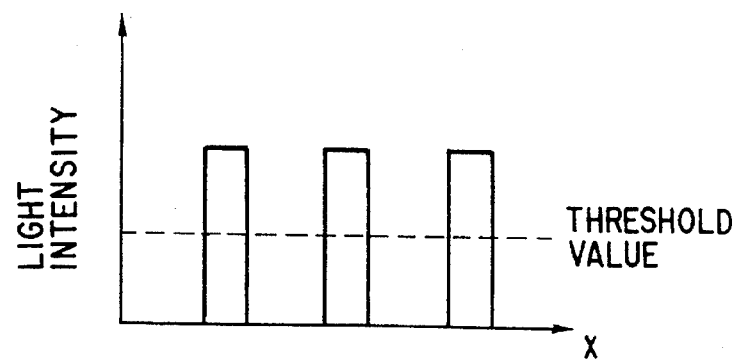
FIG. 4A is a graph showing the light intensity of dot code image formed on the image pickup device.

FIG. 4A shows the light intensity of the dot code image formed on the image pickup device. It is apparent from FIG. 4A that the light intensity of the dot code image exceeds the threshold value since it is focused on the image pickup device.

Figure 4B:
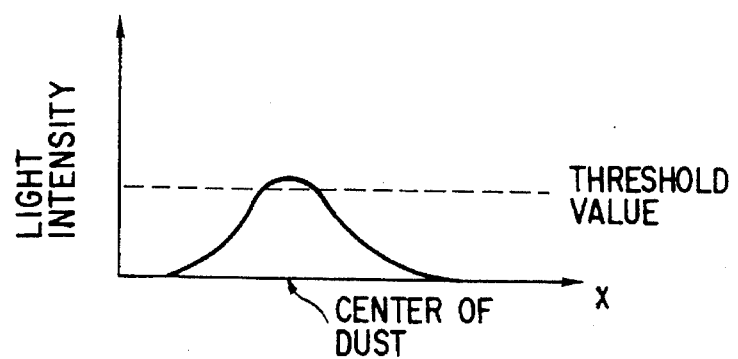
FIG. 4B is a graph showing that the light intensity exceeds a threshold value because of dust attached to a protection film.
Figure 4C:
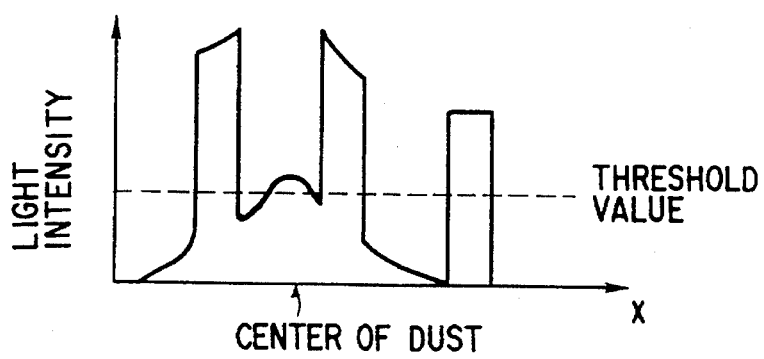
FIG. 4C is a graph showing the light intensity corresponding to a sum of the dot code and dust on the protection film.

In FIG. 4B, when the dust 30 is somewhat large and has a sufficiently high contrast, the light intensity of the dust image 26 exceeds the threshold value even though a defocus is caused by the thickness of the protection film. The light intensity obtained by adding the dust image 26 and dot code image is shown in FIG. 4C. The light intensity exceeds the threshold value in the center of the dust 30, and an error in date will occur.

Figure 5:
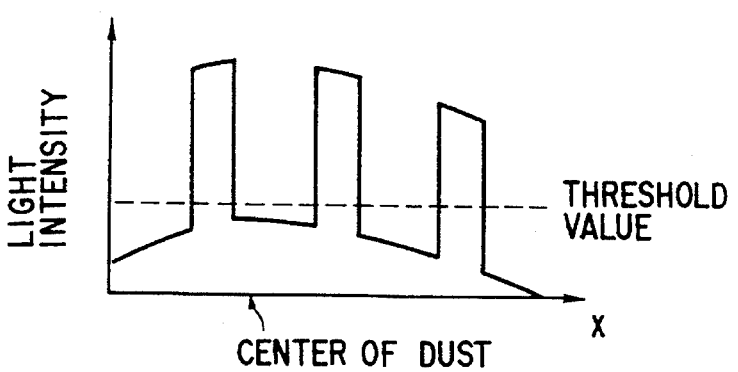
FIG. 5 is graph showing that the contrast of dust on the image pickup device is lowered by decreasing the focal depth of an image pickup optical system.

As shown in FIG. 5, if the focal depth of the optical system 24 is reduced, the dust image 26 is defocused and the contrast thereof can be lowered. While the light intensity obtained by adding the dust image 26 and dot code image is not decreased in contrast with respect to the dot code image since it is focused on the optical system 24, the light intensity of the dust image 26 can be set not higher than the threshold value since the amount of defocus of the image can be increased.

Figure 6:
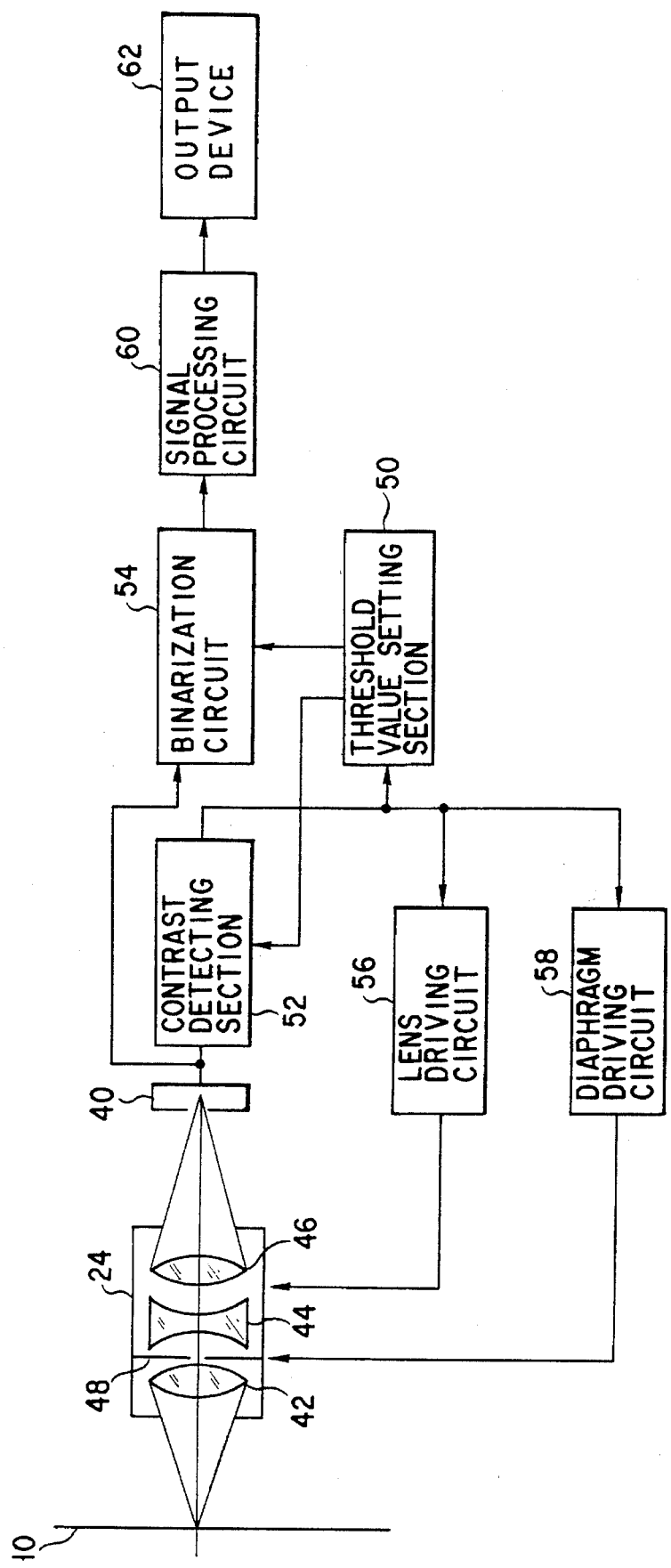
FIG. 6 is a block diagram showing a specific example of lowering a contrast value by defocusing an image of dust.

FIG. 6 is a block diagram specifically showing a constitution for lowering a contrast value by defocusing the dust image 26.

An image of the information recording medium 10 is formed on the image pickup device 40 by the image pickup optical system 24. The optical system 24 includes a focus lens 42 for adjusting the focal point of the system 24, a variator lens 44 for varying the focal length of the optical system 24, a relay lens 46 for forming an image on the image pickup device 40, and a diaphragm 48 located at the pupil of the optical system 24, for effectively varying the F number of the optical system by varying the diameter of the pupil.

A threshold value setting section 50 supplies a contrast detecting section 52 and a binarization circuit 54 with a threshold value which can be varied according to a signal corresponds to the preset light intensity or output from the contrast detecting section 52.

When receiving an image pickup signal from the image pickup device 40, the contrast detecting section 52 obtains a local contrast value of the signal when the light intensity of the signal is not lower than the threshold value, and supplies a stepwise drive signal to a lens driving circuit 56 or a diaphragm driving circuit 58 when the F number of the optical system is changed. The contrast detecting section 52 also supplied the contrast value to the threshold value setting section 50 when the binarized threshold value is varied.

The lens driving circuit 56 and diaphragm driving circuit 58 each includes a step motor and its drive circuit. Upon receiving a stepwise pulse signal from the contrast detecting section 52, the pulse motor is driven in which direction the diaphragm 48 is opened or the focal length of the optical system 24 is reduced by a predetermined amount.

The binarization circuit 54 compares the threshold value and the signal output from the image pickup device. When the output signal is larger than the threshold value, the circuit 54 supplies a level of a predetermined level to a signal processing circuit 60. When it is smaller than the threshold value, the circuit 54 supplies no signals thereto. The output signal of the signal processing circuit 60 is then supplied to an output device 62 such as a CRT and a speaker and reproduced therefrom.

Figure 7:
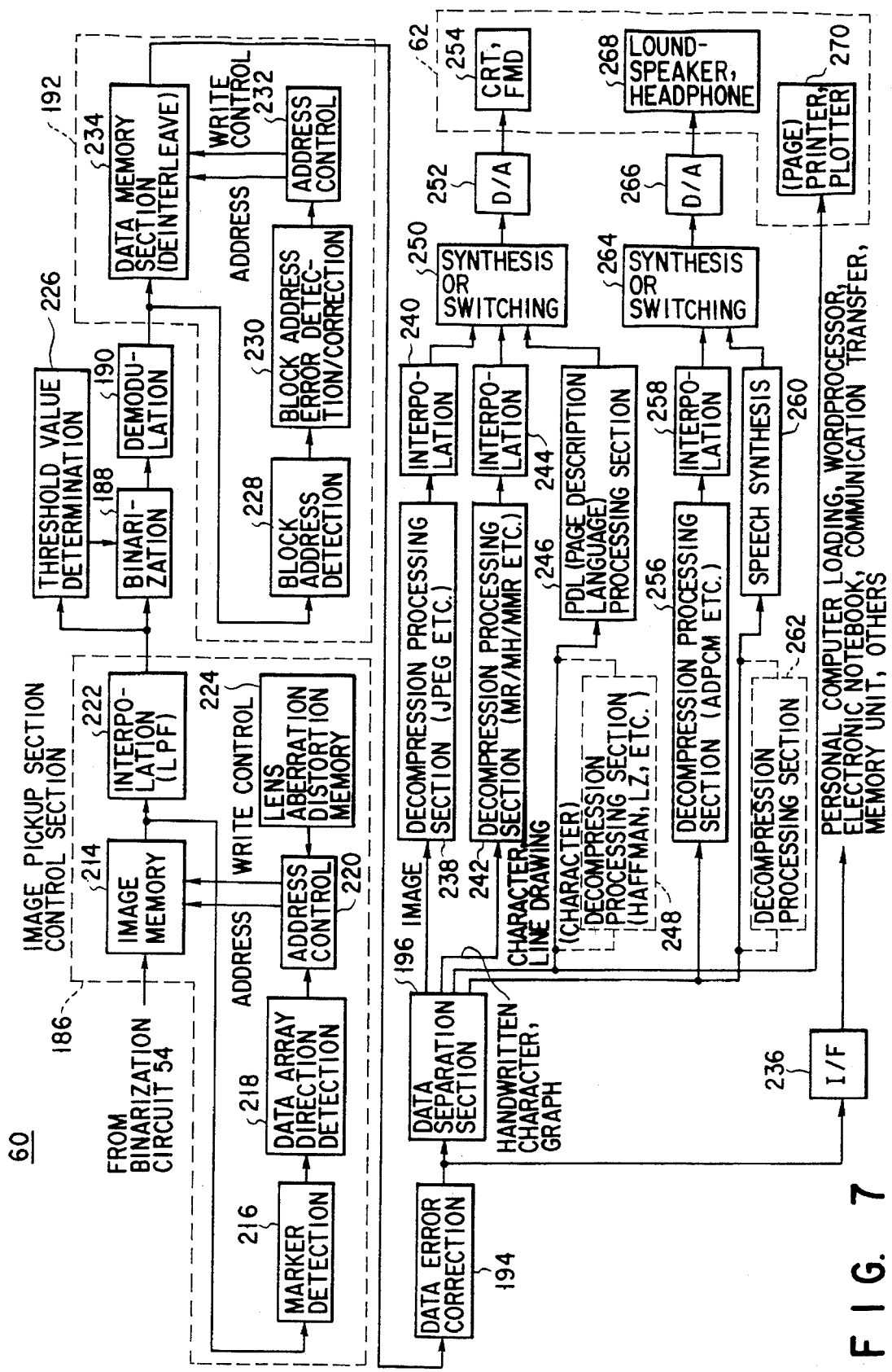
FIG. 7 is a block diagram showing the constitution of a signal processing circuit.

As shown in FIG. 7, the signal processing circuit 60 comprises a scan conversion section 186 for recognizing image data supplied from the binarization circuit 54 as a dot code and normalizing it, a binarization processing section 188 for converting multi-value data into binary data, a demodulating section 190, an adjusting section 192 for adjusting a data string, a data error correction section 194 for correcting a read error in a reproducing operation and a data error, a data separation section 196 for separating data in accordance with their attributes, and an decompression processing section for performing processing against data compression processing in accordance with the attributes of data.

The scan conversion section 186 is a section for recognizing image data supplied from the binarization circuit 54 as a dot code, and normalizing it. As a technique for this operation, the image data from the binarization circuit 54 is stored in an image memory 214, read out therefrom temporarily, and supplied to a marker detection section 216. The marker detection section 216 detects a marker of each block. A data array direction detection section 218 detects the rotation or inclination and the array direction of the data by using the markers. An address control section 220 reads out image data from the image memory 214 and supplies the data to an interpolation circuit 222 so as to correct it in accordance with the detection result. At this time, lens aberration information is read out from a memory 224 for correcting the distortion of the aberration of the lenses of the image formation optical system 24, thereby performing lens correction as well. The interpolation circuit 222 performs interpolation processing of the image data to convert it into an original pattern, i.e., a dot code.

An output from the interpolation circuit 222 is supplied to the binarization processing section 188. The dot code is basically a black and white pattern, i.e., binary information. Therefore, the data is converted into binary data by the binarization processing section 188. At this time, binarization is adaptively performed while threshold value determination is performed by a threshold value determination circuit 226 in consideration of the influences of disturbance, signal amplitude, and the like.

Since modulation has been performed, the demodulating section 190 demodulates the data, and inputs the resultant data to the data string adjusting section 192.

In the data string adjusting section 192, the block addresses of the two-dimensional blocks are detected by a block address detection section 228 first, and error detection and correction of the block addresses are then performed by a block address error detection/correction section 230. Thereafter, an address control section 232 stores the resultant data in a data memory section 234 in units of blocks. By storing the data in units of block addresses in this manner, the data can be efficiently stored even if an intermediate data portion is omitted or data is inserted in the process of storing the data.

After this operation, error correction of the data read out from the data memory section 234 is performed by the data error correction section 194. An output from the data error correction section 194 is branched to two ways. One output is supplied, as digital data, to a personal computer, a wordprocessor, an electronic notebook, or the like. The other output is supplied to the data separation section 196 to be separated into image data, handwritten character or graph data, character or line drawing data, and sound data (including two types, i.e., sound data without any processing and data having undergone speech synthesis).

Image data corresponds to natural image data, which is multi-value image data. An decompression processing section 238 performs decompression processing of this data, which corresponds to JPEG in data compression. In a data interpolation circuit 240, data for which error correction cannot be performed is interpolated.

For binary image information as of a handwritten character or a graph, an decompression processing section 242 performs decompression processing corresponding to MR/MH/MMR in data compression. In a data interpolation circuit 244, data for which error correction cannot be performed is interpolated.

Character or line drawing data is converted into a different pattern for display by a PDL (Page-Description Language) processing section 246. Note that even line drawing or character information which has been coded and undergone compression processing for a code is subjected to corresponding decompression (Huffman coding, Lempel-Ziv coding, or the like) processing in an decompression processing section 248, and is supplied to the PDL processing section 246.

Outputs from the data interpolation circuits 240 and 244 and the PDL processing section 246 are synthesized or selected by a synthesizing/switching circuit 250. The resultant data is converted into an analog signal by a D/A conversion section 252. Thereafter, the corresponding information is displayed on a display section 254 such as a CRT (TV monitor) or an FMD (face mounted display) as the output device 62. Note that the FMD is a glasses-type monitor (handy monitor) to be mounted on the face of the user, and can be effectively used for, e.g., a virtual reality operation or looking at an image on a large frame in a narrow place.

Speech information is subjected to decompression processing in an decompression processing section 256, which corresponds to ADPCM. Furthermore, in a data interpolation circuit 258, data for which error correction cannot be performed is interpolated. In performing speech synthesis, a speech synthesis section 260 receives a code for speech synthesis, actually synthesizes speech from the code, and outputs it. In this case, if the code itself is compressed, speech synthesis is performed after decompression processing such as Huffman coding or Lempel-Ziv coding processing is performed in an decompression processing section 262, as in the case of the above character or line drawing information.

Outputs from the data interpolation circuit 258 and the speech synthesis section 260 are synthesized or selected by a synthesizing/switching circuit 264. The resultant data is then converted into an analog signal by a D/A conversion section 266. The signal is output to a loudspeaker, a headphone or a speech output device 268 equivalent thereto as the output device 62.

Character or line drawing information is directly output from the data separation section 196 to a page printer or plotter 270 as the output device 62. As a result, the character information can be printed, as wordprocessor characters, on a paper sheet, or the line drawing information can be output, as a drawing, from a plotter.

As is apparent, image information can also be printed by a video printer as well as being displayed on a CRT or an FMD, or the image can be photographed.

Figure 8:
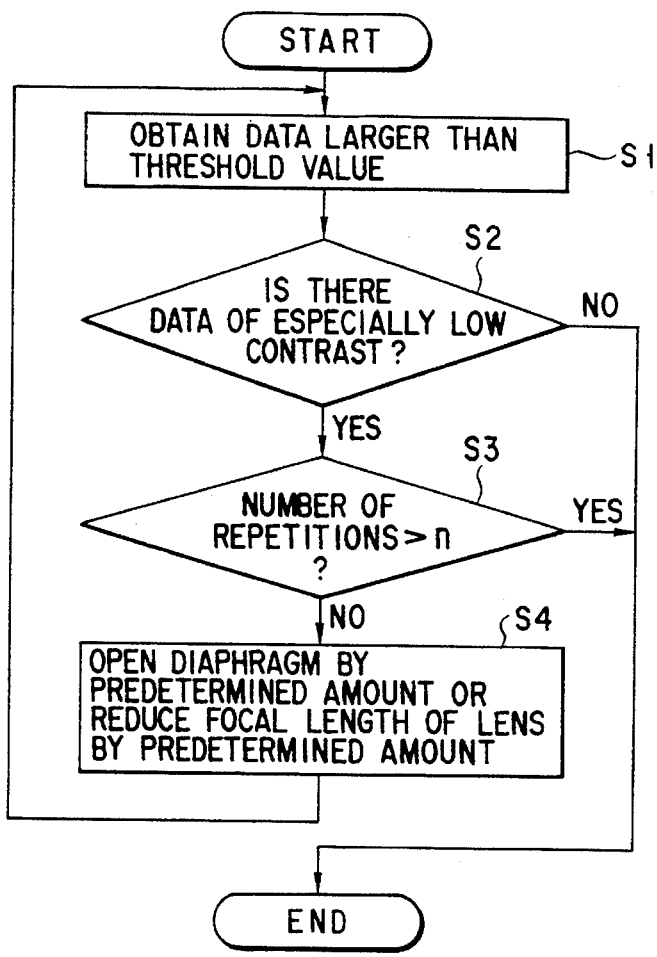
FIG. 8 is a flowchart showing a process of detecting dust.

An operation for lowering the contrast value of the dust image 26 will now be described, with reference to the flowchart of an operation for detecting dust, as shown in FIG. 8.

First in step S1 of the flowchart, data items having a contrast value exceeding a preset threshold value, are acquired by the contrast detecting section 52. In step S2, it is determined whether a data item of especially low contrast is included in the data items acquired in step S1. If the low-contrast data is not included, neither lens driving nor diaphragm driving is performed, and the dust detecting operation ends. If it is included, the diaphragm 48 is opened by a predetermined amount or the focal length of the lens is reduced by a predetermined amount. Thus, the effective F number of the image pickup optical system 24 is decreased, and the dust image 26 is defocused more greatly, with the result that the dust image 26 of lowered contrast can be formed on the image pickup device 40.

When the number of dust detecting operations is n or more in step S3 between the above steps S2 and S4, the operation ends. The reason is as follows. Since the contrast of a dot code can be considered to be lower than that of a normal one because of incompletion of printing, it is more desirable to determine that no dust is detected when a certain number of operations are repeated.

After the diaphragm 48 is opened by a predetermined amount or the focal length of the lens is reduced by a predetermined amount in step S4, the flow returns to step S1, and the same processing is started. If it is detected that the contrast of the dust image 26 is lowered, the dust detecting operation ends.

The present invention is not limited to the foregoing embodiment. Various modifications and applications can be made without departing from the scope of the subject matter of the present invention.

The subject matter of the present invention is summarized as follows.

(1) An information recording medium comprises:

an information recording medium base member on which information represented by a dot pattern having a light refractive index other than that of a surface of the information recording medium base member, is recorded; and a protection film provided on an upper surface of the dot pattern recorded on the information recording medium base member and having such an optical thickness as to lower a predetermined amount of contrast of the dot pattern.

Since the protection film, which is optically, substantially transparent, is provided on the dot pattern printed on the information recording medium base member, the printing quality can be prevented from being degraded due to wear of the dot pattern. The dust or the like attached onto the protection film having a predetermined thickness is formed as a defocused image on the plane of the image pickup device, and an adverse effect of the dust or the like upon reading of the dot pattern can thus be reduced.

(2) In the information recording medium described in above (1), if the optical thickness of the protection film is given by:

$$t = (k \times \epsilon \times F)/(\beta^2 \times n)$$

where k is constant, $\epsilon$ is pitch of the dot pattern, F is F number of an optical system of an image pickup device for picking up an image of the dot pattern, and $\beta$ is magnification of the optical system, the following formula is satisfied:

$$k > 1.0.$$

Since the optical thickness of the protection film is set such that an amount of defocus is 1.0 time as large as the pitch of the dot pattern (resolution of the optical system), the contrast of the image of the dust or the like is lowered on the pickup device plane. Therefore, an adverse effect of the dust or the like upon an image of the dot pattern reproduced in the image pickup device, can be decreased.

(3) An information reading apparatus for reading information recorded on an information recording medium having a protection film, comprises:

image pickup means for picking up an image of the information recorded on the information recording medium;

recognition means for, upon receiving image signals from the image pickup means, recognizing one of the image signals, which corresponds to an object on the protection film, as a non-information signal; and reproduction means for reproducing the information recorded on the information recording medium in response to image signals other than the non-information signal.

The reading apparatus distinguishes dust or the like on the protection film from a dot pattern and does not read it as information.

(4) In the information reading apparatus described in above (3), the recognition means includes light intensity recognization means for recognizing the image signals as information signals and non-information signals according to light intensity of the image signals, and threshold value setting means for varying a threshold value for recognizing the image signals by said light intensity recognization means.

In the information reading apparatus, when dust or the like attached onto the protection film is formed on the image pickup device as an image, a threshold value is set so as not recognize the light intensity of the image as an information signal. An adverse effect of the dust or the like can thus be reduced.

(5) In the information reading apparatus described in above (3), the image pickup means includes an optical system including a lens, and means for varying an F number of the optical system.

In the information reading apparatus, when dust or the like attached onto the protection film is formed on the image pickup device as an image, an F number is set so as not to recognize the light intensity of the image as an information signal. An adverse effect of the dust or the like can thus be reduced.

In the above-described information recording medium and information reading apparatus according to the present invention, the printing quality of the dot pattern can be prevented from being degraded due to wear, and an adverse effect of the dust or the like upon reading of the dot pattern can be lessened.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording medium comprising:

an information recording medium base member on which information is recorded by printing, said information being represented by an image formed by a dot pattern having a light refractive index different from a light refractive index of a surface of said information recording medium base member; and a protection film provided on the dot pattern recorded on said information recording medium base member, said protection film having an optical thickness sufficient to lower a predetermined amount of contrast of a flaw formed on said protection film or dust which has adhered to said protection film, and said protection film contacting an information reading apparatus when the information reading apparatus reads out the dot pattern recorded on said information recording medium base member.

2. The information recording medium according to claim 1, wherein the optical thickness of said protection film is given by:

$$t=(k \times \epsilon \times F)/(\beta^2 \times n)$$

where k is a constant, $\epsilon$ is a pitch of the dot pattern, F is an F number of an optical system of an image pickup device for picking up the image represented by the dot pattern, $\beta$ is a magnification of the optical system, and the constant k is greater than or equal to 1.0.

3. An information reading apparatus for reading information recorded on an information recording medium, the information recording medium including (i) an information recording medium base member on which the information is recorded by printing, said information being represented by an image formed by a dot pattern having a light refractive index different from a light refractive index of a surface of said information recording medium base member, and (ii) a protection film provided on the dot pattern recorded on said information recording medium base member, said protection film having an optical thickness sufficient to lower a predetermined amount of contrast of a flaw formed on said protection film or dust which has adhered to said protection film, and said protection film contacting the information reading apparatus when the information reading apparatus reads out the dot pattern recorded on said information recording medium base member, said information reading apparatus comprising:

image pickup means for picking up the image represented by the dot pattern recorded on the information recording medium, and for producing image signals in accordance with the picked up image;

recognition means for recognizing non-information signals from among the image signals produced by said image pickup means, said non-information signals corresponding to a flaw formed on said protection film or dust adhered to said protection film; and reproduction means for reproducing the information recorded on the information recording medium in response to image signals produced by said image pickup means other than the non-information signals recognized by said recognition means.

4. The information recording medium according to claim 3, wherein said recognition means includes:

light intensity recognition means for recognizing the image signals produced by said image pickup means as information signals and non-information signals according to a light intensity of the image signals; and threshold value setting means for varying a threshold value of the light intensity according to which said light intensity recognition means recognizes the image signals.

5. The information reading apparatus according to claim 3, wherein said image pickup means includes:

an optical system including a lens; and means for varying an F number of the optical system.

6. An information recording medium comprising:

an information recording medium base member on which information is recorded, said information being represented by an a dot pattern having a light refractive index different from a light refractive index of a surface of said information recording medium base member; and a protection film provided on the dot pattern recorded on said information recording medium base member, said protection film having an optical thickness sufficient to lower a predetermined amount of contrast of a flaw formed on said protection film or dust which has adhered to said protection film;

wherein the optical thickness of said protection film is given by:

$$t=(k \times \epsilon \times F)/(\beta^2 \times n)$$

where k is a constant, $\epsilon$ is a pitch of the dot pattern, F is an F number of an optical system of an image pickup device for picking up an image represented by the dot pattern, $\beta$ is a magnification of the optical system, and the constant k is greater than or equal to 1.0.

* * * * *